P. Pardee,
Insect Trap,

No. 61,561. Patented Jan. 29, 1867.

Witnesses:
John W. Shumway
H. B. Ino.

Inventor.
Phineas Pardee
By his atty
John E. Earl.

United States Patent Office.

PHINEAS PARDEE, OF NEW HAVEN, CONNECTICUT.

Letters Patent No. 61,561, dated January 29, 1867.

IMPROVEMENT IN VERMIN TRAPS.

The Schedule referred to in these Letters Patent and making part of the same.

TO ALL WHOM IT MAY CONCERN:

Be it known that I, PHINEAS PARDEE, of New Haven, in the county of New Haven, and State of Connecticut, have invented a new and useful Improvement in Vermin Trap; and I do hereby declare the following, when taken in connection with the accompanying drawings, and the letters of reference marked thereon, to be a full, clear, and exact description of the same, and which said drawings constitute part of this specification, and represent, in—

Figure 1:
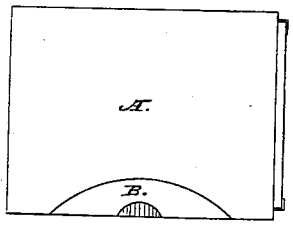
Figure 2:
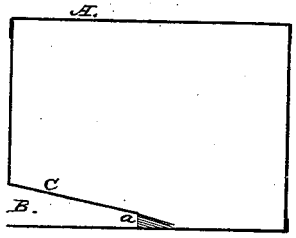
Figure 3:
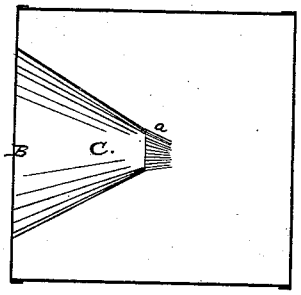

Figure 1, an entrance end view.
Figure 2, a vertical section through the entrance.
Figure 3, a horizontal section above the entrance; and in
Figure 4, my invention as applied for a tree protector.

My invention relates to improvements in traps for catching roaches, water bugs, or other vermin, and consists in enclosing the entrance to the trap with bristles, shreds of whalebone, or similar elastic material, which offer no resistance to the entrance of the vermin, but effectually prevent their return.

To enable others to construct my trap, I will proceed to describe the same, as illustrated in the accompanying drawings.

Figure 4:
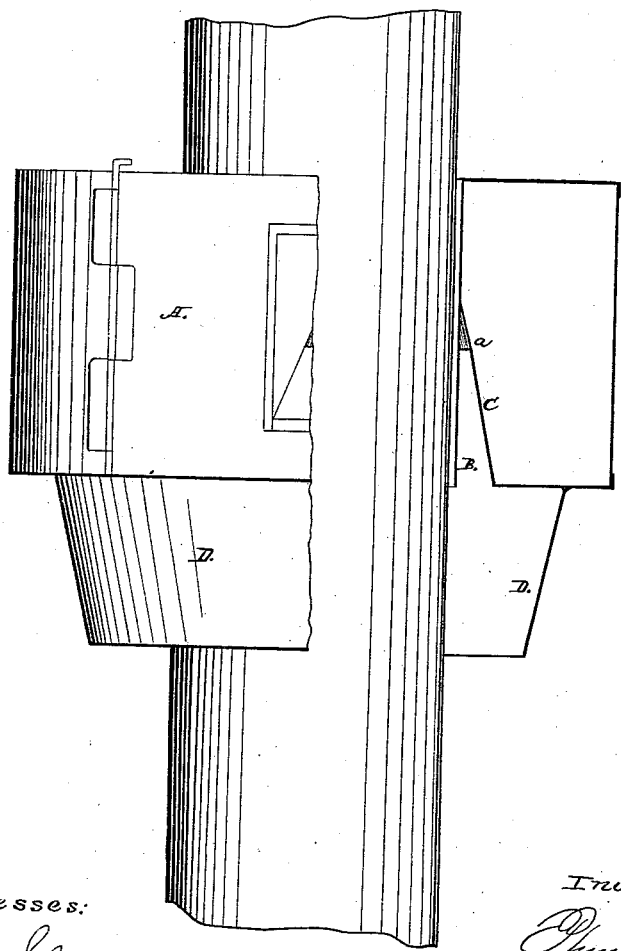

A is a case or box, of any convenient form, and made from metal, wood, or other suitable material. It is provided with one or more entrances, B. The said entrance I prefer to contract as it extends into the case, as seen in figs. 2 and 3. When thus made, I cover the entrance by a plate, C, so as to leave a small opening into the case at $a$. Upon the said plate I place numerous strands of hair bristles, shreds of whalebone, or other similar elastic material, extending forward, as seen in figs. 2 and 3, so as to lie upon the bottom of the case, thus closing the entrance. As the vermin enter through the opening B they advance to the inner opening, where the covering but slightly, if at all, obstructs their entrance. The elastic material yielding, they enter the case. Once in, the same elastic covering prevents their exit. Thus they are safely entrapped, to be removed by the removal of a lid, or opening the trap in any convenient manner, according to its construction. Instead of contracting the opening in width, as seen in fig. 3, it may be left the full width, the entire opening being covered, as before described. My trap, as thus far described, is designed for house uses. In fig. 4 I illustrate it as applied to protect trees from the "miller," so troublesome in many parts of the country. It consists simply in continuing the trap or case around the tree, making the entrance from the under side. This may be adjusted to the tree in any convenient manner, preferring to make it in segments hinged together. An apron of metal or other material, D, outside the opening or entrance B would prevent the miller from ascending over the case.

I do not broadly claim protecting the opening into the trap by means of elastic wires placed over the opening when the said protection is arranged so that the insect must pass over the said protection to enter the case, as such arrangement is not new.

Having thus fully described my invention, what I claim as my invention, and desire to secure by Letters Patent, is—

A case provided with an opening or openings B, beneath a plate C, and having the entrance protected by elastic wires or their equivalents placed around the said opening parallel to the entrance, and bearing upon the bottom or side of the case, as and for the purpose specified.

PHINEAS PARDEE.

Witnesses:
JOHN E. EARLE,
JOHN H. SHUMWAY.